Figure 1:
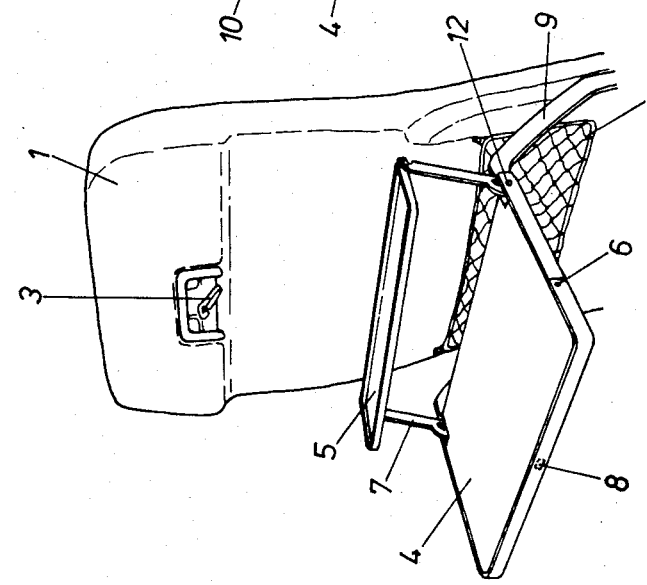

United States Patent [19]

Müller

[11] Patent Number: 4,726,621
[45] Date of Patent: Feb. 23, 1988

[54] TABLE TO BE ATTACHED AT THE REAR OF A CHAIR BACK

[76] Inventor: Per Müller, Ordruphj 46, Charlottenlund, Denmark, 2920

[21] Appl. No.: 64,944
[22] PCT Filed: Sep. 30, 1986
[86] PCT No.: PCT/DK86/00111
§ 371 Date: May 29, 1987
§ 102(e) Date: May 29, 1987
[87] PCT Pub. No.: WO87/01998
PCT Pub. Date: Apr. 9, 1987

[30] Foreign Application Priority Data

Sep. 30, 1985 [DK] Denmark .................. 4412/85

[51] Int. Cl.⁴ ............................... A47B 39/00
[52] U.S. Cl. ................... 297/146; 297/163; 297/191
[58] Field of Search ............. 297/163, 164, 165, 167, 297/168, 191, 146; 108/99, 100

[56] References Cited

U.S. PATENT DOCUMENTS

| | | | |
|---|---|---|---|
| 1,034,678 | 8/1912 | Berger et al. | 297/146 X |
| 2,252,021 | 8/1941 | Morehouse | 108/99 X |
| 2,973,028 | 2/1961 | Celeste | 297/163 |
| 3,773,381 | 11/1973 | Brennan | 297/163 X |
| 4,557,350 | 12/1985 | Wang | 297/118 X |

FOREIGN PATENT DOCUMENTS

| | | | |
|---|---|---|---|
| 1209207 | 9/1959 | France | 297/146 |
| 2005791 | 4/1969 | France | 297/191 |
| 2025212 | 1/1980 | United Kingdom | 108/99 |

Primary Examiner—James T. McCall
Attorney, Agent, or Firm—Darby & Darby

[57] ABSTRACT

In order to improve the comfort for passengers in flight cabins, busses or similar places, the table between the seats has been extended by means of an additional table (5) which may be smaller than the main table (4) and therefore particularly suited for holding glasses, cups and the like.

The table surfaces (4, 5) are mounted to the legs of the chair (9) in such a manner that the table surfaces may be swung in and out to abut the rear of the back of the chair (1) in that the connection between the tables (4, 5) is effected by distance pieces (7) or by a plate (4').

Moreover, a shelf (11) can be mounted on the outer part of the lower table (4) in order that the shelf (11) can be tilted down in the erect position of the table (FIG. 3) whereby table space is provided without limiting the passage behind the shelf.

6 Claims, 5 Drawing Figures

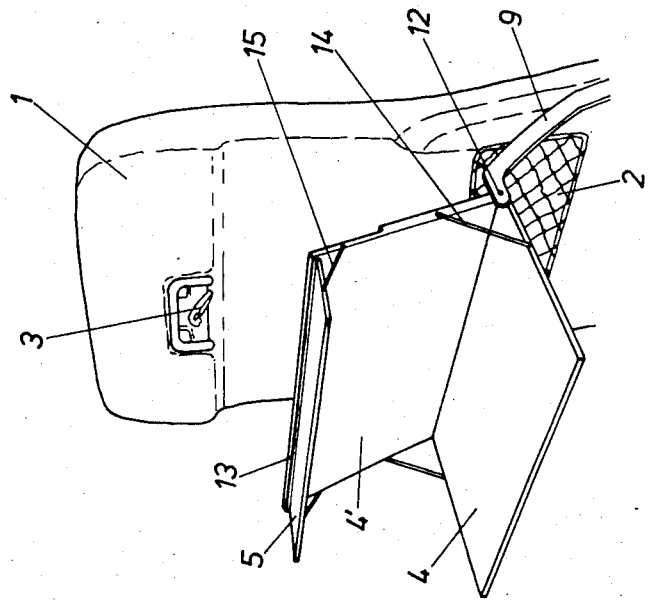
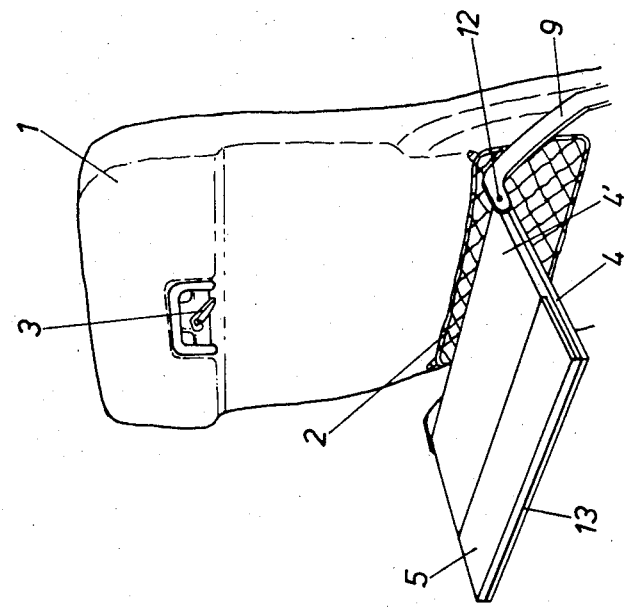
Fig. 4
Fig. 5

TABLE TO BE ATTACHED AT THE REAR OF A CHAIR BACK

The invention relates to a table to be attached at the rear of a chair back, where the table comprises two table surfaces being attached to the back of the chair in such a manner that they can be swung out from an erect position parallel to the chair back to an operative position, in which position the table surfaces are parallel to each other at different horizontal levels.

Tables of this sort are especially used in connection with seats, where the person sitting must be able to put objects or place e.g. food and beverages on the tables.

Chairs with such tables are especially mounted in flight cabins, busses, train carriages, waiting rooms and similar places where maximum comfort is required, and where it is desirable that the tables may be collapsed when not used in order that passage may take place unobstructedly between rows of chairs where the chairs stand close to each other in rows.

Tables with two table surfaces are e.g. known from the specification of U.S. Pat. No. 2,973,028 which concerns a table device which can be attached rearwardly projecting from the back of a chair. The tables are hinged to a floor bracket in such a manner that the upper table must be swung out and up before the lower table can be swung out and down. This limits the number of choices in that it is only possible to have either the upper table or having both tables together tilted down at the same time.

Morover, a table is known with only one single table surface which can be swung out and down from a folded-up position, where the table surface by means of a catch is held firmly to the back of the chair. This table surface is especially used in passenger cabins where it is required that the table is low-weight and takes up only little space in its folded-up position.

However, there is only one single table surface which either provides too much table space if for instance only a cup is to be placed on the table, or too little table space where a whole meal with drinks is served on a tray. Moreover, it is impossible to pass through the rows of chairs when such a table is tilted down, which is a considerable drawback.

It is the object of the invention to overcome these drawbacks and to obtain advantages, and this is achieved by a table, where the lower table at the rear part of the side edges is hinged to table legs being mounted at the lower part of the chair back in such a manner that the table legs may be swung out, and in that the upper table surface at the rear part of the side edges is hinged to a distance piece which is also hinged to the table legs.

This first of all provides the possibility of choosing to unfold the lower table surface only or to unfold the lower as well as the upper table surfaces simultaneously. When the lower table surface is largest, and the upper a narrower plate, a particularly advantageous construction is achieved which fully meets the requirements for a large as well as a small table for a tray, plates, and food, and for glasses, cups and beverages, respectively. This means that a better distribution of the objects on the tables is obtained, and consequently a more aesthetic and practical separation between the various objects.

Add to this that this table device does not take up more room than does the known single table, whereby is obtained a much wider choice and utility value.

By connecting the two table sections with two rails, as referred to in claim 2, a construction is achieved which is expedient in terms of low weight and little space requirements.

By, as referred to in claim 3, designing the distance piece as a plate, this plate can by the single plate position form part of this, and therefore it will not extend beyond the table surface thereby being inconvenient to the user.

By, as referred to in claim 4, providing the lower table with a further shelf at its outer part, a shelf may in the erect position of the table surfaces be tilted down, which makes it possible to place a cup, glass or the like on the shelf which will only take up as much space between the rows of chairs as the size of the shelf.

Finally, it is expedient, as referred to in claim 5, to provide the shelf with a lock which may keep this firmly and unreleasably attached to the table surface whereby it becomes possible to operate the tables without being obstructed by the shelf.

Figure 2:
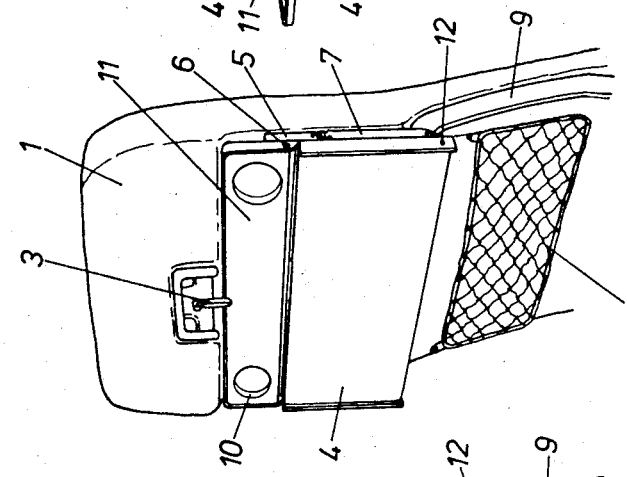
Figure 3:
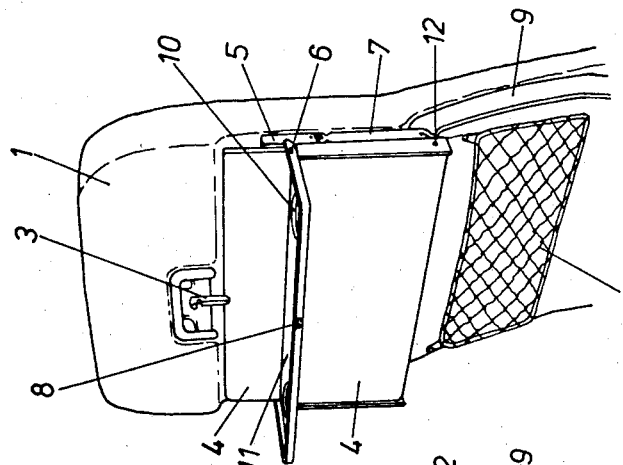

In the following the invention will be described with reference to the drawing, where FIG. 1 shows an embodiment with distance rails between the table surfaces in their unfolded position, FIG. 2 shows the table surfaces in their erect position, FIG. 3 shows the shelf unfolded in the erect position of the tables, FIG. 4 shows another embodiment with plate between the table surfaces in their unfolded position, and FIG. 5 shows the plate and the upper table surface unfolded to form one table only.

In FIGS. 1–3 is shown an example of an embodiment of the table, mounted at the back of a chair back 1 provided with a net bag 2, in that the individual parts are best observed in the unfolded position of the table, as shown in FIG. 1.

To the floor bracket of the chair is attached two table legs 9, to which the table is attached by means of an axle 12 or the like, and which table may be swung out. The actual table comprises a rectangular plate 4, which at its outer edge may have rounded corners.

Along the outer part of the table 4 it is provided with an underlying shelf 11 which may be swung out and which is mounted to the side edges of the table 4 by means of an axle 6 or the like. Moreover, the shelf 11 is held firmly to the table 4 by means of a spring lock, magnetic lock or the like, in order that it may be locked to the table, as shown in FIGS. 1 and 2, or be tilted down, as shown in FIG. 3.

The shelf may be provided with one or several recesses 10 for glass, cups, ashtrays or the like.

To the table legs is furthermore mounted two upwardly extending rails 7 which at their ends form the base of a smaller table 5, as shown in FIG. 1.

This embodiment meets several requirements, i.e. that there is a choice between two unfolded tables 4 and 5, as shown in FIG. 1, or a shelf 11, as shwon in FIG. 3. In the latter position only the shelf 11 takes up room which means that it is easy to pass it.

In the erect position of the table, as shown in FIG. 2, the tables 4 and 5 and the shelf 11 abut the chair back 1 closely, where the device can be held by means of a catch 3.

This gives a considerable advantage in use, and since the components can be made of light and strong materials, increased weight will not cause any problems.

In the embodiment shown in FIGS. 4 and 5 the rails are replaced by a rectangular plate 4', which partly connects the lower table surface 4 with the upper surface 5, but which is also provided with some kind of a stop, such as supporting means 14. In the same way the upper surface 5 is provided with braces 15 or the like, but the supporting means 14 as well as the braces 15 may be integral with the hinges 12, 13.

This embodiment have two operative positions, i.e. partly the double table, as shown in FIG. 4, and partly the single table, as shown in FIG. 5. In the latter the plates 4, 4' and 5 are put together in that the upper plate 5 is tilted around to abut the front side of the distance plate 4'. Hereby it becomes possible to use the combined surfaces as a table.

Finally, it will be possible to fold up the plates according to this embodiment to abut closely to the back of the chair back 1 and being held there by means of a catch in order that the plates take up only as much room as do the hitherto known single tables.

A further feature of this embodiment is that light and strong materials can be used in order that the added utility value causes no weight problems. Furthermore, the small plate 5 may also in this embodiment be supplied with recesses corresponding to those shown in the shelf in FIG. 2.

I claim:

1. Table to be attached at the rear of a chair back, where the table comprises two table surfaces being attached to the back of the chair in such a manner that they can be swung out from an erect position parallel to the chair back to an operative position, in which position the table surfaces are parallel to each other at different horizontal levels, characterized in that the lower table surface (4) at the rear part of the side edges is hinged (12) to table legs (9) being mounted at the lower part of the chair back (1) in such a manner that the table legs may be swung out, and in that the upper table surface (5) at the rear part of the side edges is hinged to a distance piece (7, 4') which is also hinged (12) to the table legs (9).

2. Table according to claim 1, characterized in that the distance piece is made up of rails (7) extending between the side edges of the table surfaces (4, 5), (FIG. 1).

3. Table according to claim 1, characterized in that the distance piece is made up of a plate (4') extending between the rear edges of the table surfaces (4, 5) (FIG. 4).

4. Table according to claim 1, characterized in that there to the side edges of the lower table surface (4) moreover is mounted (6) a shelf (11) extending along the bottom side of the outer part of the table surface (4), and which in the erect position of the table surfaces (4, 5) against the back of the chair (1) may be swung out to a horizontal position (FIG. 3).

5. Table according to claim 4, characterized in that the shelf (11) is provided with a lock (8) for holding it unreleasably together with the table surface (4).

6. Table according to claim 2, characterized in that there to the side edges of the lower table surface moreover is mounted a shelf extending along the bottom side of the outer part of the table surface and which in the erect position of the table surfaces against the back of the chair may be swung out to a horizontal position.

* * * * *